United States Patent [19]

Miyashita et al.

[11] Patent Number: 4,721,441

[45] Date of Patent: Jan. 26, 1988

[54] BEARING DEVICE FOR TURBOCHARGER

[75] Inventors: Kazuya Miyashita, Chiba; Nobuyuki Ikeya, Tokyo, both of Japan

[73] Assignee: Ishikawajima-Harima Jukogyo Kabushiki Kaisha, Tokyo, Japan

[21] Appl. No.: 70,617

[22] Filed: Jul. 9, 1987

Related U.S. Application Data

[63] Continuation of Ser. No. 771,047, Aug. 30, 1985, abandoned.

[30] Foreign Application Priority Data

Sep. 3, 1984 [JP] Japan .......................... 59-132772[U]
Feb. 12, 1985 [JP] Japan ............................ 60-17126[U]
Feb. 12, 1985 [JP] Japan ............................ 60-17127[U]

[51] Int. Cl.⁴ ........................ F04B 17/00; F16C 27/00
[52] U.S. Cl. ..................................... 417/407; 384/518
[58] Field of Search .................... 417/405, 406, 407; 384/517, 518, 563, 539, 99

[56] References Cited

U.S. PATENT DOCUMENTS

| | | | |
|---|---|---|---|
| 2,684,196 | 7/1954 | Wood | 417/406 |
| 2,689,528 | 9/1954 | Rainbow | 417/406 |
| 2,973,136 | 2/1961 | Greenwald | 417/407 |
| 2,991,926 | 7/1961 | Drefenderfer | 415/180 |
| 3,017,230 | 1/1962 | Meermans | 417/407 |
| 3,056,634 | 10/1962 | Woollenweber, Jr. et al. | 417/407 |
| 4,116,506 | 9/1978 | Moritomo et al. | 384/518 |
| 4,179,247 | 12/1979 | Osborn | 417/406 |
| 4,233,821 | 11/1980 | Desalve | 417/407 |
| 4,285,632 | 8/1981 | Desalve | 417/407 |
| 4,482,303 | 11/1984 | Acosta | 417/406 |
| 4,529,324 | 7/1985 | Champagne et al. | 384/518 |

Primary Examiner—Louis J. Casaregola
Assistant Examiner—Timothy S. Thorpe

[57] ABSTRACT

A bearing device for a turbocharger wherein a bearing casing is interposed between a turbine casing and a compressor casing; disposed within a bearing housing of the bearing casing are a ball bearing on the side of the turbine and a ball bearing on the side of the compressor both of which is supported by a one-piece oil film damper which is floating; and a pin is loosely fitted into the oil film damper and the bearing housing so as to prevent the rotation of the oil film damper.

12 Claims, 6 Drawing Figures

BEARING DEVICE FOR TURBOCHARGER

This is a continuation of application Ser. No. 771,047, filed Aug. 30, 1985, now abandoned.

BACKGROUND OF THE INVENTION

The present invention relates to a bearing device for a turbocharger and more particularly a bearing device for a turbocharger which can ensure stable rotation of a turbine shaft without adversely affecting the floating condition of an oil film damper.

FIG. 1 shows a conventional bearing device for a turbocharger. Reference numeral 1 designates a turbine casing; 2, a compressor casing; 3, a bearing casing between the casings 1 and 2; 4, a heat shielding plate; 5, a bearing housing disposed in the bearing casing 3; 6, a turbine shaft; 7, a turbine wheel; 8, an oil thrower spacer; 9, an oil thrower; 10, a compressor wheel; 11, a ball bearing on the side of the turbine; 12, a ball bearing on the side of the compressor; 13, an oil film damper on the side of the turbine which is disposed within the bearing housing 5 in a floating state through an oil film so as to support the ball bearing 11 on the side of the turbine; 14, a compressor-side oil film damper which is also disposed in the bearing housing 5 in a floating state through an oil film so as to support the compressor-side ball bearing 12; 15, a coiled spring interposed between the dampers 13 and 14 so that the outer races of the oil bearings 11 and 12 are moved away from each other; 16, a damper retainer; 17, a bearing spacer; 18, an oil inlet; 19, an oil outlet; 20, a water jacket; and 21 and 22, retaining rings to be described in detail hereinafter.

As described above, the conventional oil film dampers are of the split type; that is, the turbine-side oil film damper 13 and the compressor-side oil film damper 14 are disposed independently of each other. Though supported by the coiled spring 15, the oil film dampers 13 and 14 can move independently of each other so that there arises the problem that the stability in rotation of the turbine shaft 6 is decreased. Especialy when the clearances between the dampers 13 and 14 on the one hand and the bearing housing 5 on the other hand are large, the oil film dampers 13 and 14 tend to rotate easily so that the stability in rotation of the turbine shaft 6 is further decreased. Furthermore the coiled spring 15 must be preloaded to provide a force greater than the thrust of the turbine bearing so that when the thrust is exerted on the turbine or the compressor, the ball bearing 11 or 12 is prevented from being pushed into the oil film damper 13 or 14. When the force of the coiled spring 15 exerted on the dampers 13 and 14 becomes greater, the life of the ball bearings 11 and 12 is considerably shortened. Furthermore there is the problem that since the coiled spring 15 is very strong, the assembling and mechanical efficiency is remarkably decreased. It is not preferable that the stopper rings 21 and 22 are disposed and engaged with the inner end faces of the dampers 13 and 14 in order to decrease the force of the coiled spring 15 because the dampers 13 and 14 rotate in unison with the bearing shaft 6.

In the view of the above, the primary object of the present invention is to provide a bearing device for a turbocharger which can decrease the preload of the spring so that the life of the ball bearings can be increased; which can minimize mechanical losses because of the ball bearings; which can reduce turbo lag; which can interrupt the rotation of the oil film dampers so that the stability in rotation of the turbine shaft can be improved and the discharge of working oil can be facilitated, whereby the mechanical losses can be minimized; and which is simple in construction so that the fabrication of the bearing device is much facilitated.

The above and other objects, effects, features and advantages of the present invention will become more apparent from the following description of preferred embodiments thereof taken in conjunction with the accompanying drawings.

BRIEF DESCRIPTION OF THE DRAWINGS

Like reference numerals are used to designate similar parts throughout the figures.

DETAILED DESCRIPTION OF THE PREFERRED EMBODIMENTS

Figure 2:
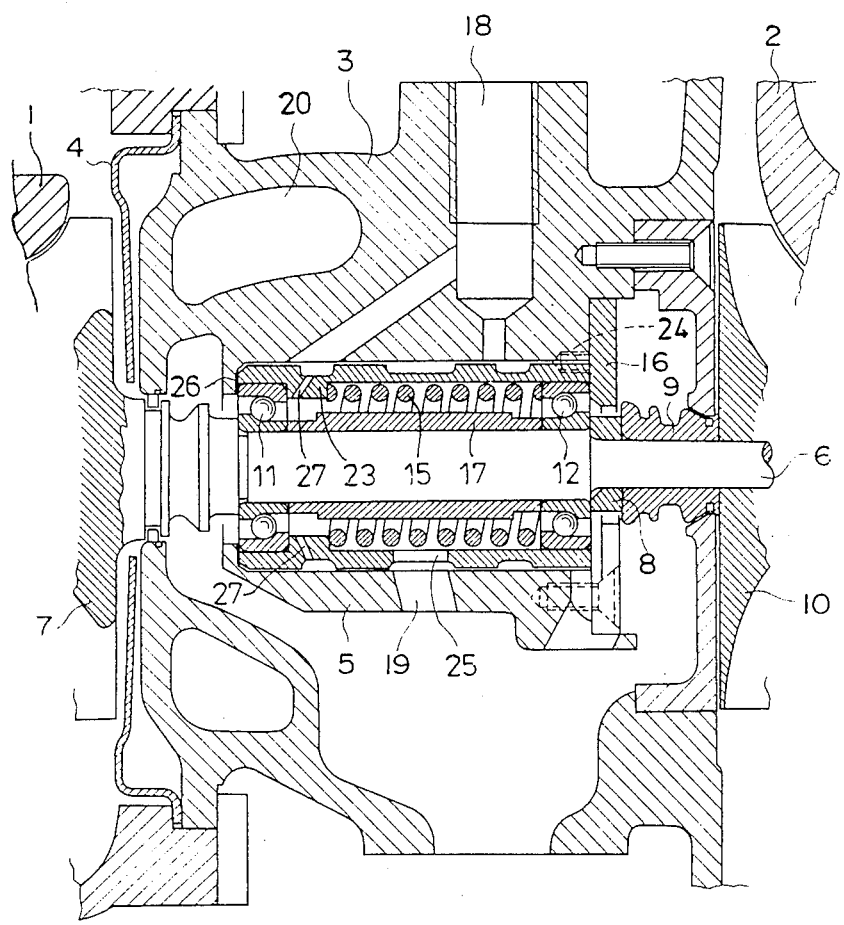
FIG. 2 is a longitudinal sectional view of a first embodiment of the present invention.

First Embodiment, FIG. 2

Figure 1:
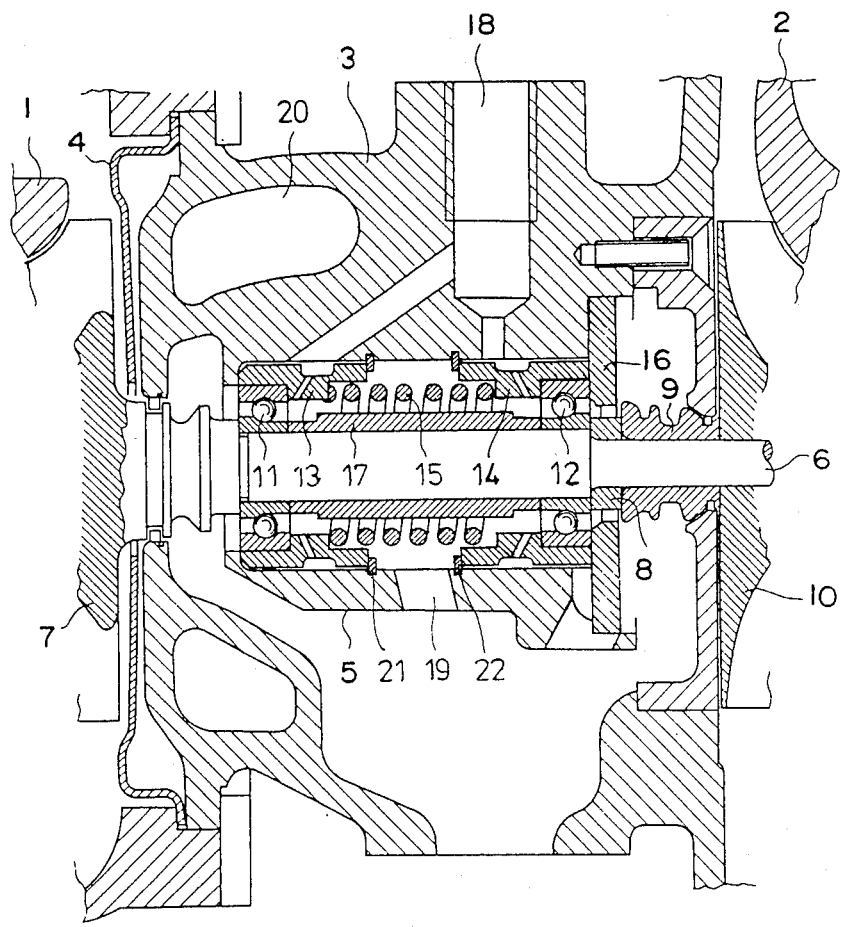
FIG. 1 is a longitudinal sectional view of a conventional bearing device for a turbocharger.

In the following description of the preferred embodiments of the present invention, the component parts which have been already described with reference to FIG. 1 shall not be described. In the first embodiment of the present invention, an oil film damper 23 which supports the turbine-side ball bearing 11 and compressor-side ball bearing 12 in the bearing housing 5 is made in one piece and is of the semi-float type. That is, the oil film camper 23 is not divided into the turbine-side damper and compressor-side damper as in the prior art. A pin 24 for preventing the rotation of the oil film damper 23 is loosely fitted into pin holes drilled into the outer peripheral surface of the oil film damper 23 and the inner surface of the bearing housing 5. An oil discharge port 25 is formed through the lower portion of the wall of the oil film damper 23 and is communicated with the oil outlet 19 at the lower portion of the bearing housing 5. There exist small clearances 26 between one of the outer end faces of the oil film damper 23 on the one hand and its opposing part on the other hand. A small hole 27 is formed through the wall of the oil film damper 23 so that the oil flowing from the oil inlet 18 is directed to the turbine-side ball bearing 11 within the oil film damper 23.

As described above, the oil film damper 23 has a unitary construction and there exists a very small clearance between the outer peripheral surface of the damper 23 and the inner surface of the bearing housing 5 so that the damping effect of oil film can be obtained, whereby the stability in rotation of the turbine shaft 6 is ensured. The pin 24 is used to prevent the rotation of the oil film damper 23 itself so that the rotation of the oil film damper 23 is prevented by the pin 24, but the oil film damper 23 is not so strictly restricted therefore the above-described damping effect is not adversely decreased. That is, the outer diameter of the pin 24 is relatively smaller than the inner diameter of the hole into which is fitted the pin 24 and is loosely fitted into the hole so that the pin 24 serves to prevent the rotation of the oil film damper 23 and will not adversely affect the above-described damping effect. As described above, according to the present invention, the pin 24 is used to prevent the rotation of the oil film damper 23 so that the oil discharge hole 25 can be formed through the lower portion thereof. As a result, the mechanical losses due to the accumulation of the lubricating oil within the damper 23 can be avoided. Furthermore, since the lubricating oil can be discharged efficiently, the oil seal effect can be improved.

Part of the lubricating oil which leaks through the clearances 26 between the end of the oil film damper 23 on the one hand and its opposing inner wall surface of the bearing housing 5 on the other hand impinges against the turbine shaft 6 and other component parts disposed adjacent thereto and turns into mist. As a result, the ball bearings 11 and 12 are surrounded with the oil mist. That is, the ball bearings 11 and 12 are subjected to mist or splash lubrication. Furthermore, according to the first embodiment, in order to ensure the positive lubrication of the turbine-side ball bearing 11, the fine lubricating hole 27 is formed through the wall of the damper 23 and is directed toward the inner end of the ball bearing 11. Therefore the ball bearing 11 is subjected to jet lubrication; that is, the jet of lubricating oil is discharged toward the ball bearing 11. However, it is to be understood that only the small jet lubrication hole 27 or the narrow clearances 26 for mist lubrication may be employed and that neither of them may be needed.

Figure 3:
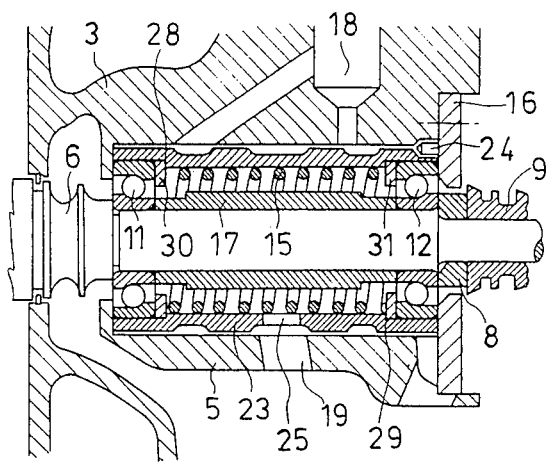
FIG. 3 is a longitudinal sectional view of a second embodiment of the present invention.

Second Embodiment, FIG. 3

Referring next to FIG. 3, the second embodiment of the present invention will be described. A stopper ring 30 is interposed between the stepped portion 28 of the oil film damper 23 and the outer case of the ball bearing 11 while in the like manner a stopper ring 31 is interposed between the stepped portion 29 of the damper 23 and the outer race of the ball bearing 12 and the coiled spring 15 which causes the outer races of the ball bearings 11 and 12 to move away from each other is interposed between the stopper rings 30 and 31. That is, the stopper rings 30 and 31 are clamped between the coiled spring 15 on the one hand and the ball bearings 11 and 12 on the other hand. The preload of the coiled spring 15 is transmitted positively to the outer races of the ball bearings 11 and 12. The inner surface of the oil film damper 23 is formed with the stepped portions 28 and 29. As a consequence, even when the thrust greater than the preload of the coiled spring 15 acts, the ball bearings 11 and 12 can be prevented from being pushed into the oil film damper 23. Therefore, the coiled spring 15 may have a relatively small preload and consequently may have a relatively lower spring force so that the life of the ball bearings 11 and 12 can be increased and furthermore the assembly and mechanical efficiency can be considerably improved.

Figure 4:
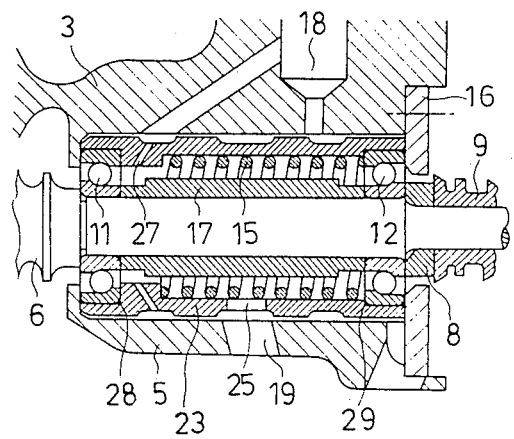
FIG. 4 is a longitudinal sectional view of a third embodiment of the present invention.

Third Embodiment, FIG. 4

Referring next to FIG. 4, the third embodiment of the present invention will be described. In this embodiment, the stopper rings 30 and 31 are eliminated and the stepped portions 28 and 29 of the damper 23 directly engage with the outer races of the ball bearings 11 and 12, respectively. Moreover, opposed to the second embodiment shown in FIG. 3, the oil film damper 23 is not symmetrical with respect to the midpoint of the axis of the damper 23 and the jet lubrication hole 27 is formed through the wall of the damper 23 to lubricate the turbine-side ball bearing 11, but the third embodiment can attain the same effects, features and advantages as the second embodiment.

Figure 5:
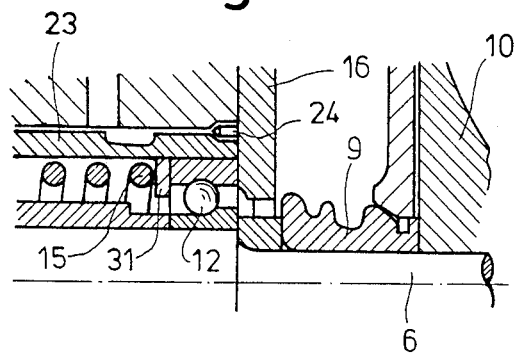
FIG. 5 is a longitudinal sectional view, on enlarged scale, of a fourth embodiment of the present invention.

Fourth Embodiment, FIG. 5

The fourth embodiment shown in FIG. 5 is substantially similar in construction to the third embodiment shown in FIG. 4 except that the stopper ring 31 as shown in FIG. 3 is further provided only in the side of the compressor. The construction of the fourth embodiment on the side of the turbine is substantially similar to that of the third embodiment shown in FIG. 4.

Figure 6:
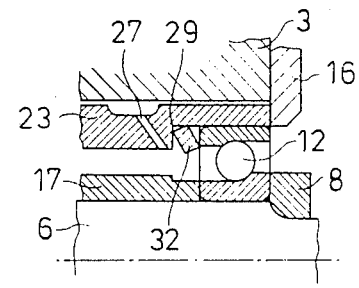
FIG. 6 is a longitudinal sectional view, on enlarged scale, of a fifth embodiment of the present invention.

Fifth Embodiment, FIG. 6

Referring next to FIG. 6, the fifth embodiment of the present invention will be described. In the first through fourth embodiments shown in FIGS. 2 through 5, the coiled spring 15 is so preloaded that the outer races of the ball bearings 11 and 12 are moved away from each other; but in this embodiment instead of the coiled spring 15, a dished spring 32 is used. More particularly, the dished spring 32 is interposed between the stepped portion 29 of the oil film damper 23 and the outer race of the ball bearing 12. Even though not shown, a dished spring may be also interposed between the shoulder 30 of the damper 23 and the outer race of the turbine-side ball bearing 11. Instead of the coiled spring or the dished spring described above, the present invention may use a leaf spring.

The unique effects, features and advantages of the present invention may be summarized as follows:

(I) The ball bearing are used on both the turbine and compressor sides so that the mechanical losses can be minimized. As a result, the overall efficiency of the turbocharger is remarkably increased especially at low speeds or in a low output range. This is a very important merit for the turbochargers for vehicles and the turbo lag can be minimized.

(II) The oil film damper which floats is made in one piece and its rotation is prevented by the pin. As a result, the stability in rotation of the turbine shaft can be assured in all operational ranges and the durability of ball bearings is improved so that their life is increased. As a result, high reliability can be attained.

(III) The pin for preventing the rotation of the oil film damper is loosely fitted into its mating hole so that the floating state of the damper is not adversely affected.

(IV) Means for preventing the rotation of the damper is simple and is available at a low cost.

(V) The oil film damper is formed with the oil discharge port in communication with the oil outlet of the bearing housing so that the mechanical losses due to the accumulation of the lubricating oil in the damper can be minimized. Furthermore, the lubricating oil discharge can be facilitated so that the oil sealability is improved.

(VI) The ball bearing is subjected at least to either lubrication in which part of the lubricating oil supplied to the oil film damper is discharged as a jet toward the ball bearing or mist (substantially splash) lubrication. As a result, the positive lubrication is ensured and opposed to the conventional slide bearings, a large amount of lubricating oil is not needed. Therefore, the lubricating oil can be considerably reduced. Moreover, the oil pressure can be decreased.

(VII) It is not needed to add a thrust bearing individually and it is also not needed to surface harden the journal of the turbine shaft. Therefore, the bearing device of the present invention is simple in construction, compact in size and inexpensive to fabricate.

(VIII) The inner wall surface of the oil film damper is formed with the stepped portions which are made into engagement with the bearing stoppers so that when a thrust greater than the preload of the spring acts, the ball bearings can be prevented from being pushed into the damper. Therefore, it is not needed to preload largely the spring so as to match with an excessive thrust. In other words, the spring may be preloaded to a minimum degree. Therefore, the life of the ball bearings can be further increased and at the same time the mechanical and assembly efficiency can be improved.

We claim:

1. A turbocharger comprising: a turbine casing, a compressor casing, a bearing casing interposed between said turbine and compressor casings, a turbine ball bearing unit adjacent to said turbine casing, and a compressor ball bearing unit adjacent to said compressor casing, a turbine shaft supported by said bearing units, a one-piece monolithic oil film damper mounted in said bearing casing to be interposed between said bearing casing and said ball bearing units, said oil film damper being spaced from said bearing casing to define a gap with said bearing casing for essentially the entire length of said oil film damper and engaging both of said ball bearing units, means for injecting oil into said gap for floatingly mounting said oil film damper in said bearing casing, and a pin loosely connecting said oil film damper to said bearing casing to prevent rotation of said oil film damper relative to said bearing casing, said pin being received in a slot defined in said oil film damper and in a slot defined in said bearing casing to allow said oil film damper to float with respect to said bearing casing.

2. A turbocharger according to claim 13 wherein said oil injecting means includes an oil discharge port in communication with an oil outlet of said bearing housing.

3. A turbocharger according to claim 13 wherein said one-piece oil film damper is provided with at least either a small hole formed for effecting jet lubrication of said ball bearing with part of an oil film formed between said oil film damper and said bearing housing or clearances for subjecting said ball bearings to mist lubrication.

4. A turbocharger according to claim 2 wherein said one-piece oil film damper is provided with at least either a small hole formed for effecting jet lubrication of said ball bearing with part of an oil film formed between said oil film damper and said bearing housing or clearances for subjecting said ball bearings to mist lubrication.

5. A turbocharger according to claim 1, comprising a spring between the ball bearing adjacent the turbine and the ball bearing adjacent the compressor, said spring being so preloaded that an outer race of at least one of said ball bearings is moved away from an outer race of the other ball bearing in a direction parallel to the longitudinal axis of the turbine shaft; an inner wall surface of said oil film damper having stepped portions, and bearing stoppers engaging said stepped portions, so that when an axial thrust of said turbine shaft in excess of the preload of said spring acts, said ball bearings are prevented from moving toward each other.

6. A turbocharger according to claim 2, comprising a spring interposed between the ball bearing adjacent the turbine and the ball bearing adjacent the compressor, said spring being so preloaded that an outer race of at least one of said ball bearings is moved away from an outer race of the other ball bearing in a direction parallel to the longitudinal axis of the turbine shaft; an inner wall surface of said oil film damper having stepped portions, and bearing stoppers engaging said stepped portions, so that when an axial thrust of said turbine shaft in excess of the preload of said spring acts, said ball bearings are prevented from moving toward each other.

7. A turbocharger according to claim 3, comprising a spring interposed between the ball bearings adjacent the turbine and the ball bearing adjacent the compressor, said spring being so preloaded that an outer race of at least one of said ball bearings is moved away from an outer race of the other ball bearing in a direction parallel to the longitudinal axis of the turbine shaft; an inner wall surface of said oil film damper having stepped portions, and bearing stoppers engaging said stepped portions, so that when an axial thrust of said turbine shaft in excess of the preload of said spring acts, said ball bearings are prevented from moving toward each other.

8. A turbocharger according to claim 4, comprising a spring interposed between the ball bearing adjacent the turbine and the ball bearing adjacent the compressor, said spring being so preloaded that an outer race of at least one of said ball bearings is moved away from an outer race of the other ball bearing in a direction parallel to the longitudinal axis of the turbine shaft; an inner wall surface of said oil film damper having stepped portions, and bearing stoppers engaging said stepped portions, so that when an axial thrust of said turbine shaft in excess of said spring acts, said ball bearings are prevented from moving toward each other.

9. a turbocharger according to claim 5 wherein stopper rings are interposed between the stepped portions of said oil film damper on the one hand and the outer races of said ball bearings on the other hand.

10. A turbocharger according to claim 6 wherein stopper rings are interposed between the stepped portions of said oil film damper on the one hand and the outer races of said ball bearings on the other hand.

11. A turbocharger according to claim 7 wherein the stopper rings are interposed between the stepped portions of said oil film damper on the one hand and the outer races of said ball bearings on the other hand.

12. A turbocharger according to claim 8 wherein stopper rings are interposed between the stepped portions of said oil film damper on the one hand and the outer races of said ball bearings on the other hand.

* * * * *

UNITED STATES PATENT AND TRADEMARK OFFICE
CERTIFICATE OF CORRECTION

PATENT NO. : 4,721,441
DATED : January 26, 1988
INVENTOR(S) : Kazuya Miyashita et al It is certified that error appears in the above-identified patent and that said Letters Patent are hereby corrected as shown below:

Column 5, lines 40 and 44, for the claim reference numeral, each occurrence, "13" should read --1--;

Column 6, line 45 "a" should read --A--.

Signed and Sealed this

Twelfth Day of July, 1988

Attest:

DONALD J. QUIGG

Attesting Officer

Commissioner of Patents and Trademarks